(No Model.)  4 Sheets—Sheet 1.

A. R. GUSTAFSON.
IRONING MACHINE.

No. 490,113. Patented Jan. 17, 1893.

Witnesses
Geo. W. Young
N. E. Oliphant

Inventor
Axel R. Gustafson
By H. G. Underwood
Attorney (No Model.) 4 Sheets—Sheet 2.
A. R. GUSTAFSON.
IRONING MACHINE.
No. 490,113. Patented Jan. 17, 1893.
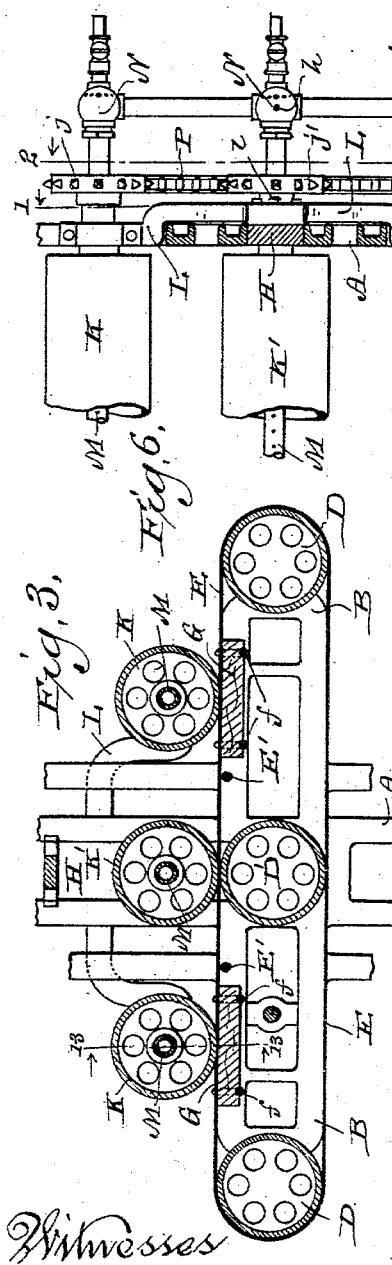
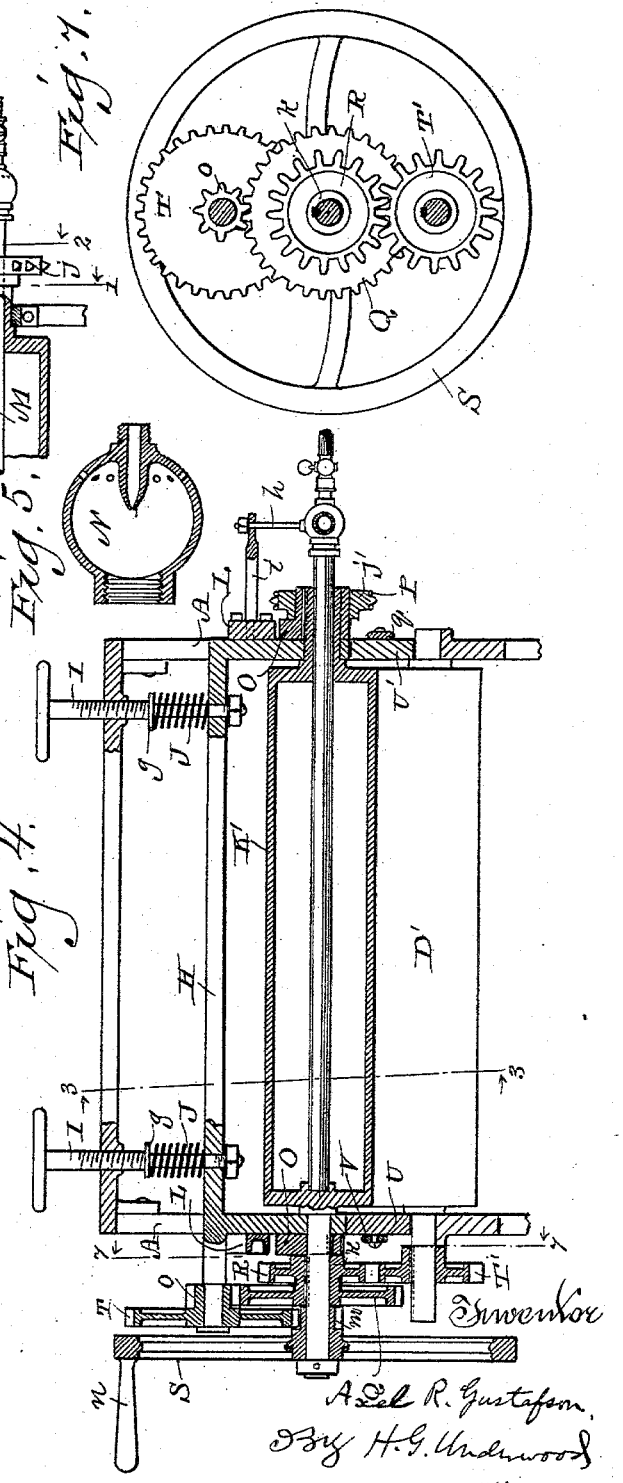
Witnesses
Geo. W. Young.
N. E. Oliphant.
Inventor
Axel R. Gustafson.
By H. G. Underwood
Attorney (No Model.) 4 Sheets—Sheet 3.

A. R. GUSTAFSON.
IRONING MACHINE.

No. 490,113. Patented Jan. 17, 1893.

Witnesses
Geo. W. Young.
N. E. Oliphant.

Inventor
Axel R. Gustafson
By H. G. Underwood
Attorneys (No Model.) 4 Sheets—Sheet 4.
A. R. GUSTAFSON.
IRONING MACHINE.
No. 490,113. Patented Jan. 17, 1893.
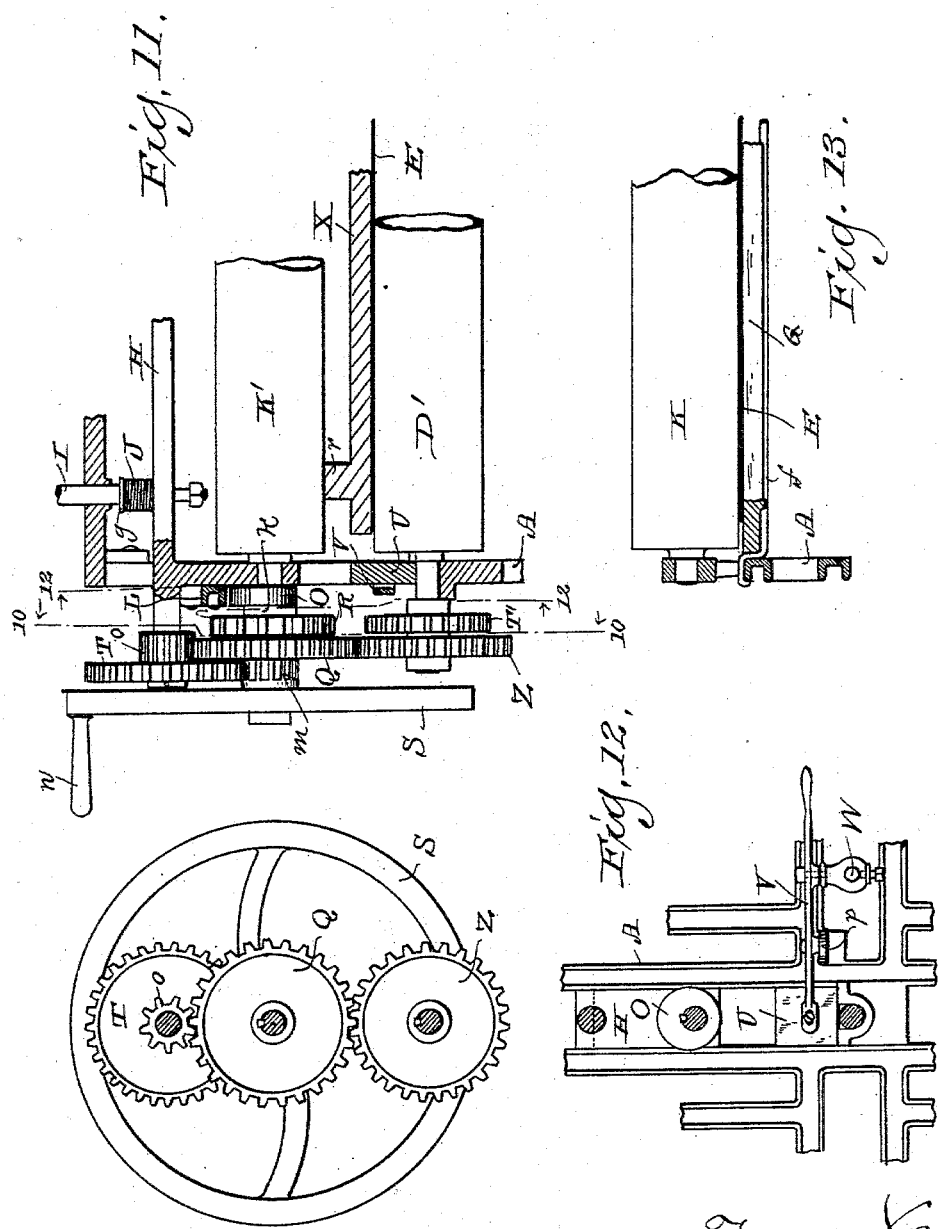
Witnesses
Geo. W. Youny
N. E. Oliphant
Inventor
Axel R. Gustafson
By H. G. Underwood
Attorney

UNITED STATES PATENT OFFICE.

AXEL R. GUSTAFSON, OF CHICAGO, ILLINOIS, ASSIGNOR OF ONE-HALF TO WILLIAM F. ANDERSON, OF NEGAUNEE, MICHIGAN.

IRONING-MACHINE.

SPECIFICATION forming part of Letters Patent No. 490,113, dated January 17, 1893.

Application filed August 29, 1892. Serial No. 444,349. (No model.)

*To all whom it may concern:*

Be it known that I, AXEL R. GUSTAFSON, a citizen of the United States, and a resident of Chicago, in the county of Cook, and in the State of Illinois, have invented certain new and useful Improvements in Ironing-Machines; and I do hereby declare that the following is a full, clear, and exact description thereof.

My invention has for its object to provide for the ironing of various classes of laundry work on a single machine, whereby I effect a saving of expense and space usually necessary in a first class laundry; and the said invention consists in certain peculiarities of construction and combination of parts hereinafter described with reference to the accompanying drawings and subsequently claimed.

Figure 1:
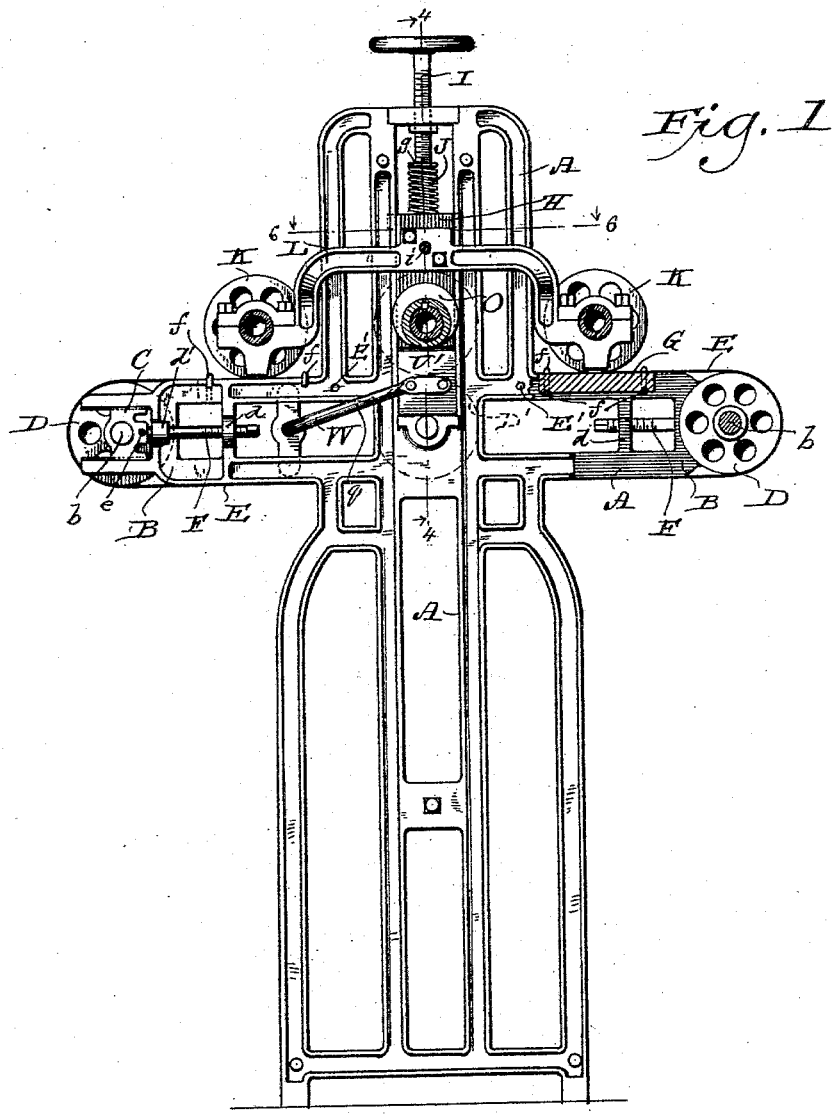
Figure 8:
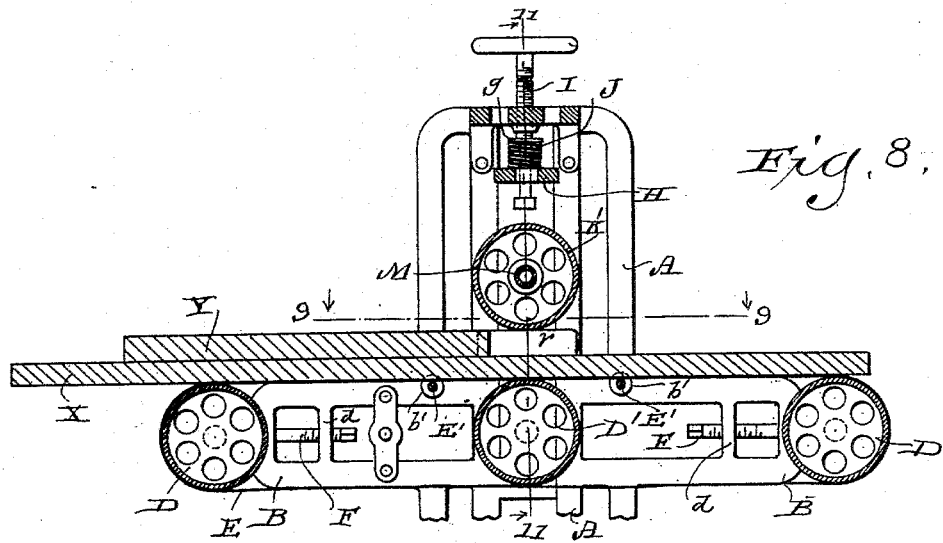

In the drawings: Figure 1 represents a side elevation of my improved machine partly in section on line 1—1 of Fig. 6, Fig. 2, a like view on line 2—2 of Fig. 6, Fig. 3, a vertical longitudinal section on line 3—3 of Fig. 4, Fig. 4, a similar view on line 4—4 of Fig. 1, Fig. 5, a detail horizontal section illustrating an air and gas mixer constituting part of the machine, Fig. 6, a detail plan view partly in section on line 6—6 of Fig. 1, Fig. 7, a detail elevation partly in section on line 7—7 of Fig. 4, Fig. 8, a vertical longitudinal section on line 8—8 of the succeeding figure, Fig. 9, a plan view partly broken away and in section on line 9—9 of the preceding figure, Fig. 10, a detail elevation partly in section on line 10—10 of the succeeding figure, Fig. 11, a vertical transverse section on line 11—11 of Fig. 8, Fig. 12, a detail elevation on line 12—12 of the preceding figure, and Fig. 13, a vertical transverse section on line 13—13 of Fig. 3.

Referring by letter to the drawings, A A represent a pair of skeleton standards united by various transverse braces to form the main frame of my improved laundry machine, said standards being provided with lateral extensions B extending in opposite directions therefrom, the free ends of these extensions being in the form of guides for bearings C for the journals $b$ of rollers D on which I arrange an endless apron E, and intermediate of these rollers I journal another roller D' in the standards. The apron E is guided and held against lateral movement by disks $b'$ on transverse frame rods E', best illustrated in Fig. 9. Engaging sockets $c$ in the journal bearings C are the annularly grooved ends of screw-pins F that work in guides $d$ $d'$ forming parts of the lateral extensions B of the frame-standards, the guide $d$ relative to each pin being threaded to correspond with the screw-threads on said pins. By means of a set screw $e$ engaging each journal bearing C and the annular groove in the corresponding screw-pin F the latter and the relative bearing are caused to move together when said pin is actuated, the free end of this pin being squared to engage a wrench or key. By turning the screw-pins the rollers D may be run in or out to regulate the tension of the apron E that runs thereon.

When the machine is organized for the purpose of ironing plain goods such as sheets table-cloths and various other articles. I suspend narrow tables G on the lateral extensions B of the main frame-standards and beneath the upper portion of the apron E, just under the rollers K, K, as shown in Figs. 3 and 13, the means of suspension being preferably rods $f$ that fit in corresponding grooves in the tables and have their ends in the form of hooks for detachable engagement with said standard-extensions.

Arranged to work on guides, forming part of the main-frame standards is an auxiliary frame H that is best illustrated in Fig. 4, this latter frame being connected to the former by adjusting screws I on which spiral-springs J are arranged beneath shoulders $g$, the expansive power of these springs being exerted against said auxiliary frame, and their tension regulated by the adjustment of said screws.

Journaled in the auxiliary frame is a roller K' in line with the one D' above specified and when the machine is organized for ironing plain goods other rollers K K journaled in yokes L detachably connected to said auxiliary frame, are in line with the tables G hereinbefore set forth. The rollers K K' turn freely on perforated pipes M joined to gas and air mixers N of any suitable construction, such for instance as is shown in detail in Fig. 5, these mixers being supported by a headed rod $h$ engaging a bracket $i$ that extends from the auxiliary frame, as shown in Fig. 4.

Figure 2:
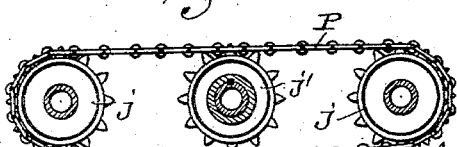

At the mixer side of the machine the journal of the roller K' has a cam O keyed thereon and fast on the hub of this cam is a sprocket-wheel $j'$ that engages a link-belt P, which latter is also engaged with other sprocket-wheels $j$ fast on journals of the rollers K K that are hung in the yoke L at said mixer side of the machine, this link-belt gear being best shown in Figs. 2 and 6. On that side of the machine farthest from the mixers N another cam O, and the single hub $k$ of differential spur-wheels Q, R, are keyed on the adjacent journal of the roller K', as shown in Fig. 4, and loose on this journal is the pinion-hub $m$ of a fly-wheel S, which latter may be driven by a crank $n$ or other suitable means. The pinion hub of the fly-wheel is in mesh with a spur-wheel T loose on a stud extended from the auxiliary frame H, this spur-wheel being of itself provided with a pinion-hub $o$ that meshes with the spur-wheel Q, whereby motion is imparted to the roller K', and the spur-wheel R meshes with another spur-wheel T' keyed to a journal of the roller D' whereby motion is imparted to the endless apron E above specified. The goods to be ironed are fed in on the endless apron to be dried and ironed by the rollers K K', that are heated by gas, burned at the perforations in the pipes M, and exert pressure on the roller D' and table G hereinbefore set forth.

Figure 9:
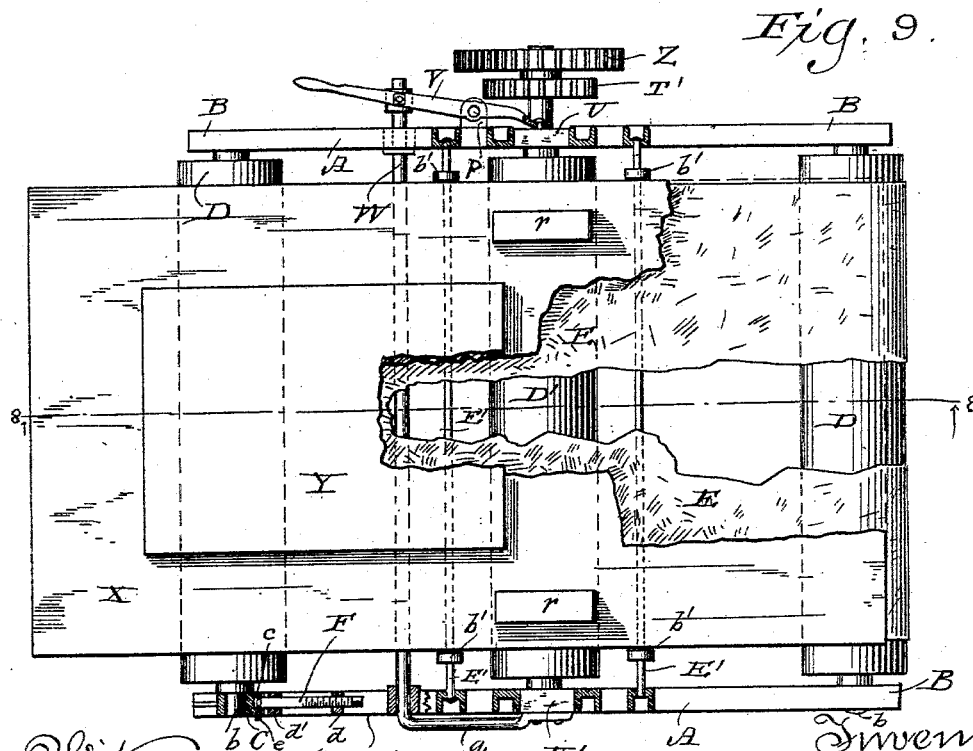

Arranged on each standard A in position to be normally out of the path of the cams O are blocks U U', the first of these blocks being connected to a lever V fulcrumed to a lug $p$ on the adjacent standard, and shackled to this lever is a sliding rod W having a bent end $q$ rigidly secured to the block U', this construction and arrangement of parts being fully illustrated in Fig. 9, and partially illustrated in Figs. 1 and 12. By actuating the lever V the blocks U U' will be thrown out into the paths of the cams O and this operation will result in a lift of the auxiliary frame H against the power of the springs J to thereby bring the rollers K K' out of contact with the apron E or material thereon.

To organize the machine for ironing starched goods, the auxiliary frame H is lifted and normally supported by vertical blocks $r$ on a table X that rests on the upper surface of the apron E to move therewith, under the control of the operator, this table being provided with an ironing surface or board Y equal in height to said blocks and in rear of the same for the greater part of its length. Owing to the elevation of the auxiliary frame, in the latter organization of the machine, the spur-wheel R is brought out of engagement with the one T' on a journal of the apron roller D', and I therefore key another spur-wheel Z on said journal as shown in Figs. 10 and 11 this latter spur-wheel being arranged to mesh with the one Q that is relative to the ironing roller K', the diameter of the spur-wheel Q being greater than the one Z, whereby there will be a differential rotation of the relative iron and apron-rollers to thereby cause the exertion of a polishing friction on goods upon the board Y on the table X, the latter being run back and forth according to the direction the apron E is made to travel, the tables G being disengaged from the machine or left thereon, as may be found desirable on the part of the operator.

Having now fully described my invention what I claim as new and desire to secure by Letters-Patent is:

1. A laundry machine comprising a suitable main frame, parallel transverse rollers journaled therein, an endless apron arranged on the rollers, an auxiliary frame under yielding pressure, a roller journaled in the latter frame in line with one of the apron-rollers, yokes connected to the auxiliary frame, rollers journaled in these yokes, tables arranged on the main frame under the upper portion of the apron in line with the yoke-rollers, suitable means for heating the rollers journaled in the auxiliary frame and yokes, and other suitable means for driving the auxiliary frame roller and the apron-roller in line therewith, substantially as set forth.

2. A laundry machine comprising a main frame, an endless apron arranged on rollers journaled in the frame, an auxiliary frame under yielding pressure in the main one, an ironing roller journaled in the auxiliary frame in line with one of the apron-rollers, cams fast on the journals of said ironing roller, blocks normally retained on the main frame, a lever mechanism connected to the blocks to bring them in and out of the path of the cams, and a drive-mechanism in gear with the ironing roller and adjacent apron-roller, substantially as set forth.

3. A laundry machine comprising a main-frame, an endless apron arranged on rollers journaled in the frame, an auxiliary frame under yielding pressure in the main one, an ironing roller journaled in the auxiliary frame in line with one of the apron-rollers, a table supported on the apron and provided with blocks that normally support said auxiliary frame, a board on the table of a height equal to the blocks and in rear of the latter for the greater part of its length, and a suitable drive-mechanism in gear with the ironing roller and adjacent apron-roller, substantially as set forth.

In testimony that I claim the foregoing I have hereunto set my hand, at Chicago, in the county of Cook and State of Illinois, in the presence of two witnesses.

AXEL R. GUSTAFSON.

Witnesses:
ARTHUR JONES,
C. W. MCMILLAN.